United States Patent [19]
Braun et al.

[11] Patent Number: 5,213,199
[45] Date of Patent: May 25, 1993

[54] CHAIN ARRANGEMENT FOR DRAG-CHAIN CONVEYORS

[75] Inventors: Gert Braun; Ernst Braun, both of Essen, Fed. Rep. of Germany

[73] Assignee: Halbach and Braun Industrieanlagen, Wuppertal, Fed. Rep. of Germany

[21] Appl. No.: 641,931

[22] Filed: Jan. 16, 1991

[30] Foreign Application Priority Data

Mar. 10, 1990 [DE] Fed. Rep. of Germany ....... 4007685

[51] Int. Cl.$^5$ ............................................. B65G 19/24
[52] U.S. Cl. ..................................... 198/731; 198/733
[58] Field of Search ................................ 198/731, 733

[56] References Cited

U.S. PATENT DOCUMENTS

| | | | |
|---|---|---|---|
| 3,954,168 | 5/1946 | Braun et al. | 198/733 |
| 4,265,359 | 5/1981 | Temme | 198/731 |
| 4,790,425 | 12/1988 | Braun et al. | 198/731 |
| 4,867,300 | 9/1989 | Braun et al. | 198/731 |

FOREIGN PATENT DOCUMENTS

| | | | |
|---|---|---|---|
| 2319917 | 11/1973 | Fed. Rep. of Germany | 198/733 |
| 397662 | 1/1974 | U.S.S.R. | 198/733 |
| 1316936 | 6/1987 | U.S.S.R. | 198/731 |

*Primary Examiner*—Joseph E. Valenza
*Attorney, Agent, or Firm*—Anderson Kill Olick & Oshinsky

[57] ABSTRACT

A chain arrangement for drag-chain conveyors. The chain arrangement includes a round-link chain with vertical chain links, horizontal chain links and pushers fastened on horizontal chain links. The pushers engage with pusher projections into the respective horizontal chain links. The outer radius of the chain link arc members of the vertical chain links is selected smaller than the inner radius of spherically-shaped recesses in the pusher projections. The resulting play ensures that the pushers travel without jamming and enter without problems into the guide surfaces of the upper portion of the conveyor trough of the drag-chain conveyor.

2 Claims, 3 Drawing Sheets

CHAIN ARRANGEMENT FOR DRAG-CHAIN CONVEYORS

BACKGROUND OF THE INVENTION

1. Field of the Invention

The present invention relates to a chain arrangement for drag-chain conveyors. The chain arrangement includes a round-link chain with vertical chain links and horizontal chain links and pushers which are fastened to horizontal chain links with predetermined spacings. The pushers engage into the respective horizontal chain links with a pusher projection and the pusher projections have on both sides thereof a spherically-shaped recess for the chain link arc members of the adjacent vertical chain links.

2. Description of the Related Art

In chain arrangements of the above-described type, the outer radius of the chain link arc member of the vertical chain links which dip into the spherically-shaped recesses of the pusher projections corresponds to the inner radius of the spherically-shaped recesses. This may lead to problems when the chain travels around chain drums. Since no play exists between the chain link arc members and the pusher projections, the pushers have the tendency to become jammed between the area where the chain leaves the chain drums and the guide means of the upper portion of a conveyor trough. This, in turn, results in the chain strand to be raised and, thus, the pushers enter into the guide means of the upper portion of the conveyor trough in an uncontrolled manner. It is the purpose of the invention to eliminate these problems.

SUMMARY OF THE INVENTION

Thus, it is the object of the present invention to provide a chain arrangement for drag-chain conveyors of the above-described type in which jamming of the pushers in the area where the chain leaves the chain drum is prevented and a problem-free entry into the subsequent guide means of the upper portion of the conveyor trough is ensured.

In accordance with the present invention, in a chain arrangement of the above-described type, the outer radius of the chain link arc members of the vertical chain links is selected smaller than the inner radius of the spherically-shaped recesses of the pusher projections, while maintaining the diameter in the apex portions of the chain link arc members of the vertical chain links.

As a result of the features of the present invention, an increasing play is realized from the apex portion of the chain link arc members to the transition to the chain link side members. However, since the diameter in the apex portion of the chain link arc members of the vertical chain links is unchanged, the changed pitch and, thus, the minimum distance of the horizontal chain link arc members to the engaging pusher projections are maintained. The increasing play results in a travel without jamming of the chain around the chain drums and particularly in the exit area between the chain drum and the guide means of the upper portion of the subsequent conveyor trough. Indeed, the chain strand is no longer raised when leaving the chain drum because of the play mentioned above. Rather, it is made possible that the pushers enter the subsequent guide means of the upper portions without squeezing and, thus, without problems.

The chain arrangement according to the present invention behaves in the transition area of chain drum to the guide means of the upper portion like a suspension chain. This means that it is ensured that the pushers are always perfectly aligned between the exit from the chain drum and the entry into the guide means of the upper portion of the conveyor trough.

This travel of the chain and pushers without jamming is maintained even when taking into consideration the usual wear between the chain links. In this connection, the present invention further teaches that the outer radius of the chain link arc members is selected smaller than the inner radius of the spherically-shaped recesses by a dimension which exceeds the maximum permissible pitch wear between the engaging chain link arc members of the respective horizontal vertical chain links. The maximum pitch wear is considered to be a wear of about 2 mm, because a chain arrangement for drag-chain conveyors with greater wear becomes useless and must be replaced.

Not only conventional round-link chains for drag-chain conveyors are within the scope of the present invention. Also within the scope of the present invention are those embodiments in which the vertical chain links have a smaller pitch than the horizontal chain links and the added pitch of vertical chain links and horizontal chain links corresponds to the added pitch of two standardized chain links of a lower size, while taking into consideration a cross-section which is selected in the chain link arc members or the apex portions thereof greater than the cross-section of the chain link side members. Thus, for example, starting from horizontal chain links, it may be a so-called 42 round-link chain, but with the added pitch of a 38 round-link chain as set forth by the German Industrial Standards.

While a specific embodiment of the invention has been shown and described in detail to illustrate the application of the inventive principle, it will be understood that the invention may be embodied otherwise without departing from such principles.

DESCRIPTION OF THE PREFERRED EMBODIMENT

Figure 1:
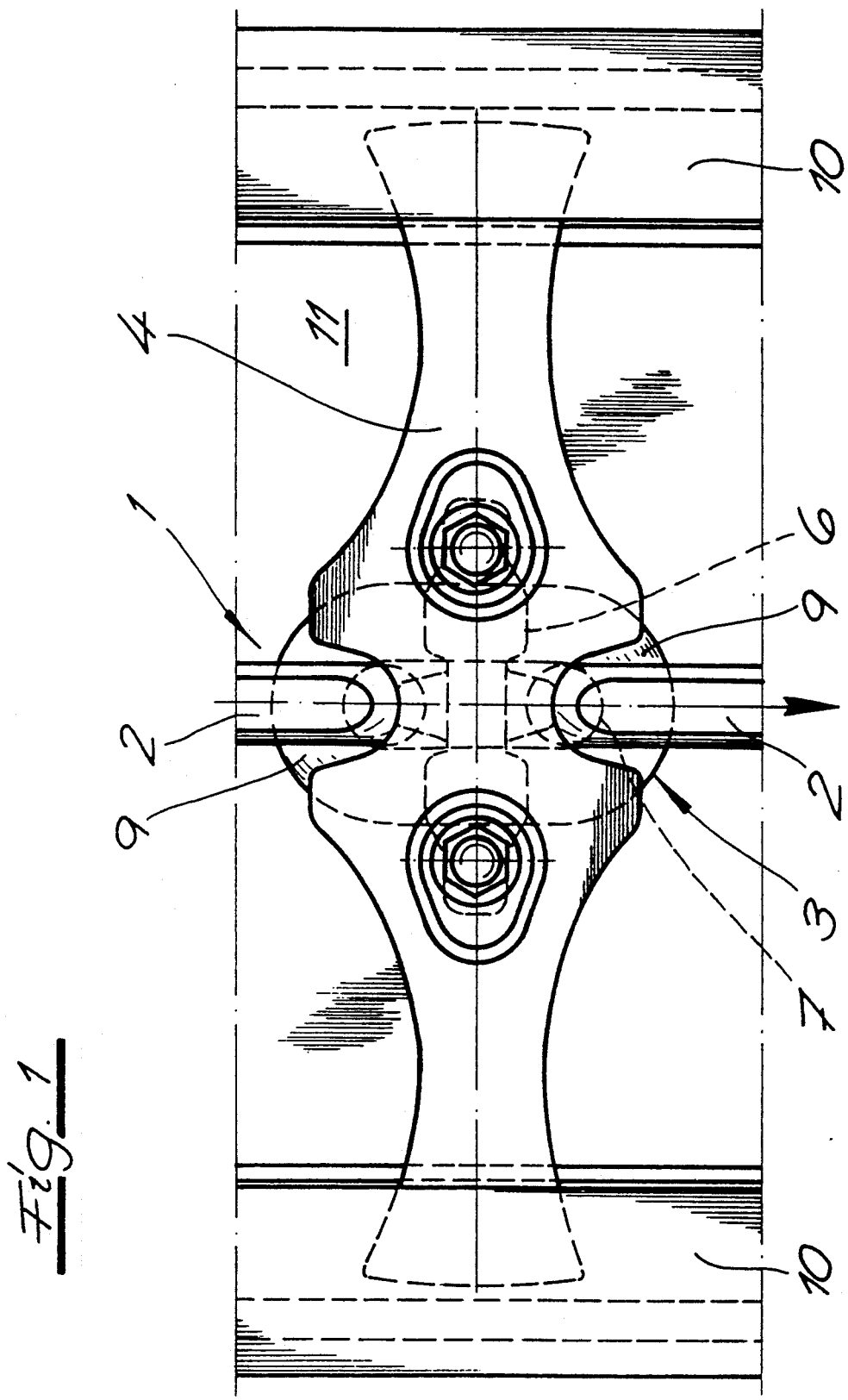
FIG. 1 is a partial plan view of a chain arrangement according to the present invention.
Figure 2:
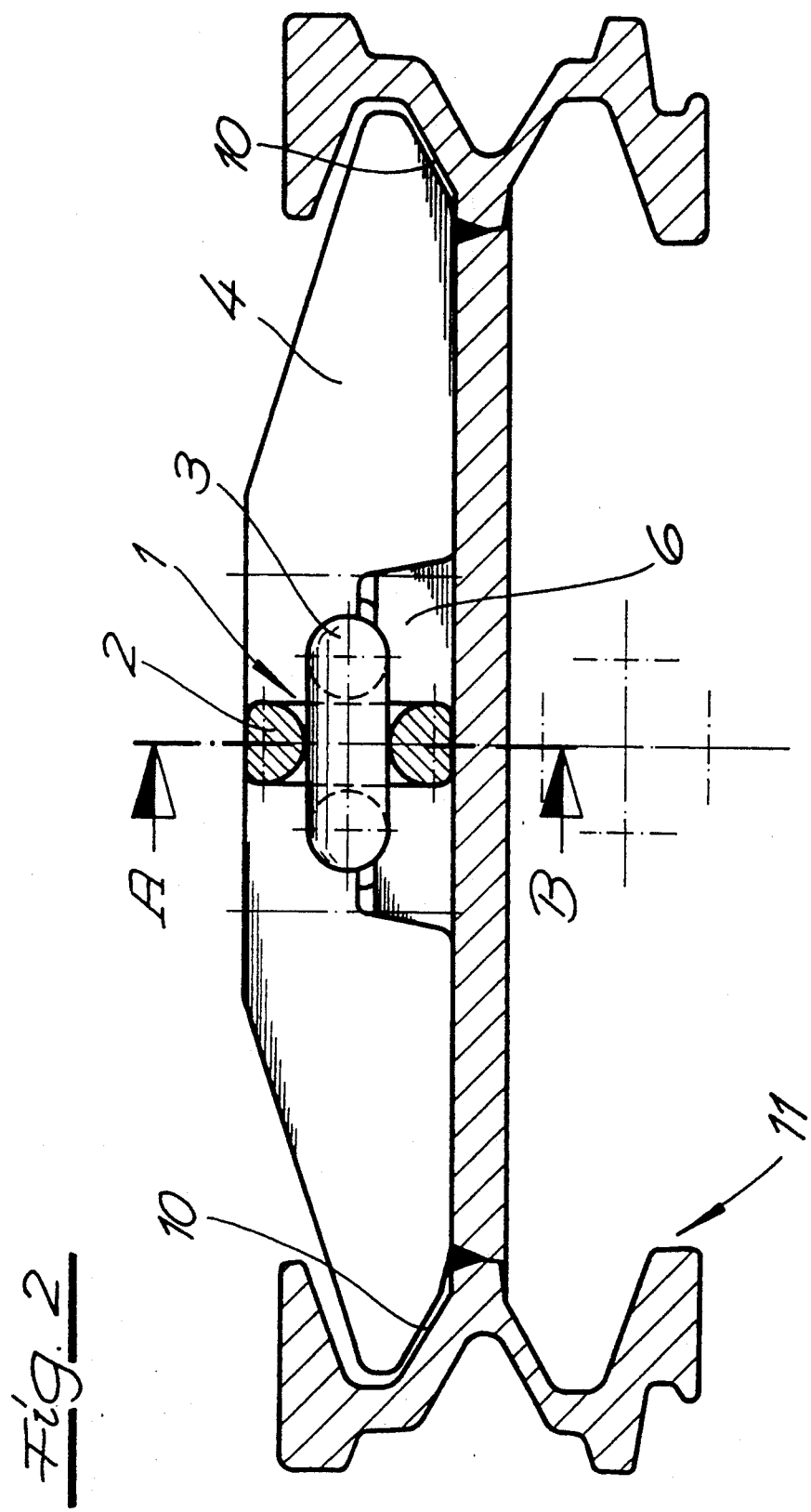
FIG. 2 is a partial axial sectional view of the chain arrangement of FIG. 1 taken through a vertical chain link in the region of a pusher.

The Figures of the drawing show part of a chain arrangement 1 for a drag-chain conveyor. The chain arrangement basically includes a round-link chain with vertical chain links 2 and horizontal chain links 3 and pushers 4 which are fastened to the horizontal chain links 3 with predetermined spacings. The pushers 4 engage with a pusher projection 5 into the respective horizontal chain links and are fastened under the horizontal chain links 3 by means of chain stirrups 6.

The pusher projections 5 have on both sides thereof a spherically-shaped recess 8 for the chain link arc members 7 of the adjacent vertical chain links 2. The outer radius r of the chain link arc members 7 of the vertical chain links 2, while maintaining its diameter D in the apex portion S, is selected smaller by a predetermined dimension than the inner radius R of the spherically-shaped recesses 8 of the pusher projections 5.

In accordance with a preferred feature, the outer radius r of the chain link arc members 7 is selected smaller than the inner radius R of the spherically-shaped recesses 8 by a dimension which exceeds the maximum permissible pitch wear between the engaging chain link arc members 7, 9 of the vertical chain links 2 and horizontal chain links 3.

In the illustrated embodiment, the horizontal chain link 3 corresponds to a so-called 42 round-link chain. On the other hand, the following compact vertical chain link 2 corresponds to a 38 round-link chain. In these vertical chain links 2, the cross-section of the chain link arc members 7 in the apex portion S has a diameter of 46 mm, while the cross-section of the chain link arc members 9 of the horizontal chain link 3 in the apex portion has a diameter of only 42 mm. The inner radius R of the spherically-shaped recesses 8 of the pusher projection 5 is approximately 71 mm, while the outer radius r of the chain link arc members 7 of the vertical chain links 2 is only 60 mm.

Figure 3:
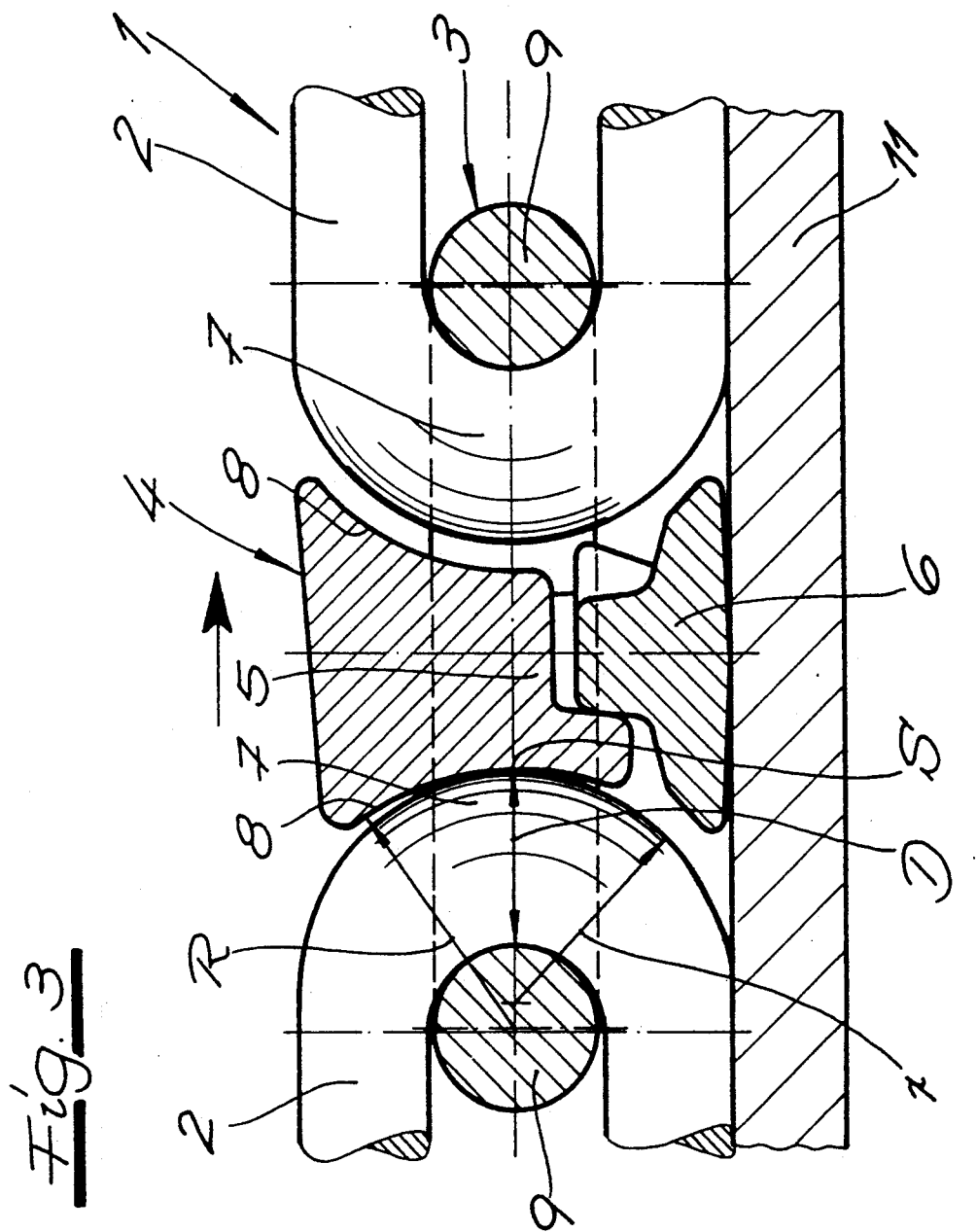
FIG. 3 is a sectional view taken along sectional line A-B of FIG. 2.

The dimensions described above result in a play which increases from the apex portion S to the outer portion and which may reach about 4 mm. On the other hand, the minimum distance between the pushers 4 and the respective chain link arc members 9 of the horizontal chain link 3 remains unchanged at 46 mm even under the tensional load resulting from the conveyance in the direction indicated by an arrow in FIGS. 1 and 3. Thus, this distance corresponds to the diameter of the chain link arc member 7 of the respective vertical chain link 2. This distance is also maintained when the chain arrangement 1 travels and is bent around the chain drum, while it is ensured because of the play referred to above that the pushers travel without jamming around the chain drums and into the guide surfaces 10 of the conveyor trough 11 of the drag-chain conveyor.

While a specific embodiment of the invention has been shown and described in detail to illustrate the application of the inventive principle, it will be understood that the invention may be embodied otherwise without departing from such principles.

We claim:

1. A chain arrangement for drag-chain conveyors, the chain arrangement comprising a round-link chain with vertical chain links and horizontal chain links and pushers fastened to the horizontal chain links, the pushers being spaced apart at predetermined distances, the pushers having pusher projections which engage into the horizontal chain links, the vertical and horizontal chain links having chain link arc members, the chain link arc members of the vertical chain links including an apex portion, the apex portion having a constant diameter, the pusher projections having on both sides thereof a spherically-shaped recess for the chain link arc members of adjacent vertical chain links, the spherically-shaped recesses having an inner diameter, the chain link arc members of the vertical chain links having an outer radius which is smaller than the inner radius of the spherically-shaped recesses of the pusher projections.

2. The chain arrangement according to claim 1, wherein the outer radius of the chain link arc members of the vertical chain links is smaller than the inner radius of the spherically-shaped recesses by a dimension which exceeds a maximum pitch wear between interengaging vertical chain links and horizontal chain links.

* * * * *